Feb. 9, 1960 A. GREINER ET AL 2,924,190

FIXTURE FOR SOLDERING A PREFOCUSING COLLAR TO A BASE OF AN INCANDESCENT PROJECTION LAMP

Filed Oct. 31, 1952 4 Sheets-Sheet 1

INVENTORS
ARNO GREINER,
OTTO R. WOLLENTIN.
BY
[signature]
ATTORNEY

Feb. 9, 1960 A. GREINER ET AL 2,924,190

FIXTURE FOR SOLDERING A PREFOCUSING COLLAR TO A BASE OF AN INCANDESCENT PROJECTION LAMP

Filed Oct. 31, 1952 4 Sheets-Sheet 2

INVENTORS
ARNO GREINER
OTTO R. WOLLENTIN
BY
ATTORNEY

Feb. 9, 1960 A. GREINER ET AL 2,924,190

FIXTURE FOR SOLDERING A PREFOCUSING COLLAR TO A BASE OF AN INCANDESCENT PROJECTION LAMP

Filed Oct. 31, 1952 4 Sheets-Sheet 3

INVENTORS
ARNO GREINER,
OTTO R. WOLLENTIN.
BY
ATTORNEY

INVENTORS
ARNO GREINER,
OTTO R. WOLLENTIN.
BY
ATTORNEY

United States Patent Office 2,924,190

Patented Feb. 9, 1960

2,924,190

FIXTURE FOR SOLDERING A PREFOCUSING COLLAR TO A BASE OF AN INCANDESCENT PROJECTION LAMP

Arno Greiner, Irvington, and Otto R. Wollentin, East Keansburg, N.J., assignors to Westinghouse Electric Corporation, East Pittsburgh, Pa., a corporation of Pennsylvania Application October 31, 1952, Serial No. 317,852

4 Claims. (Cl. 113—99)

The present invention relates to the manufacture of incandescent lamps and, more particularly, to a fixture for joining a prefocusing collar to a projection lamp base.

The characteristic features of projection lamps are compact filaments accurately positioned with respect to the base, for purposes of light control; relatively short life for high efficiency and brightness; comparatively small bulbs; and a restricted burning position. The objective in projection lamps is to fill the aperture of the projection system with a uniform light source of high brightness. This is accomplished by arranging the filament coils in a single or double vertical plane accurately located with respect to the optical system by a prefocus base. The bi-plane filament, with coils arranged in two parallel rows, so placed that the coils of one row fill in the spaces between those of the other, has much greater uniformity and higher average brightness than the single row mono-plane filament.

In the manufacture of projection lamps the lamp mount is first sealed to the tubular envelope and the lamp exhausted automatically in conventional sealex equipment. After tip-off the prefocus base is cemented about the lamp neck and the leads are soldered to the base eyelet contacts. A prefocusing collar is then visually aligned in a hand soldering fixture with respect to the bi-plane filament and then soldered to the shell of the base so that upon insertion of the lamp into a conventional socket, the prefocusing collar will always mount the lamp filament in the proper position with respect to the projection apparatus.

One of the defects of the visual hand soldering fixture method has been the dependence of the success of the operation upon the eye and judgment of the operator. The production rate is slow and unit cost is high.

Hence, it has been found advantageous according to our invention to provide an improved soldering fixture and visual projection testing unit which improves accuracy of prefocusing and quality of the lamps, speeds production and decreases unit cost. The soldering fixture comprises essentially an elevating and focusing unit, a collar support unit, and a base centralizer unit.

The based lamp is inserted in a vertical "base-up" position with the rounded dome of the lamp envelope resting in a cup shaped cavity located on a focusing block on top of the elevating spindle of the focusing unit. The prefocusing collar is slipped over the lamp base and locked in a nest provided in the collar support unit. The base centralizer unit, hinged on an upright bracket, is swung downwardly onto the lamp base thus suspending the lamp between the base centralizer unit and the focusing block of the elevating and focusing unit and locking the lamp in position for soldering.

Sufficient current is supplied from the base centralizer unit to light the filament to the desired brightness so that its image appears in two positions on a screen of the visual projection testing unit. By means of the focusing block and the elevating spindle of the elevating and focusing unit, the lamp is moved horizontally and vertically respectively with respect to the collar until the filament image appears within the lines marked on two positions on the screen of the projector unit.

When the proper adjustment is obtained between the planes of the filament and the prefocusing collar, the soldering fixture is rotated in either direction so that solder may flow completely around the collar, or may be more conveniently applied at selected points, thus securely joining the collar to the base.

In its general aspect an object of the present invention is the elimination of defects and disadvantages of the prior art visual hand soldering fixtures for joining a prefocusing collar to a projection lamp base.

Specifically, an object of the present invention is an improved soldering fixture which enables an operator to get good quality, speed production and lower unit manufacturing cost.

Another object is a soldering fixture comprising an elevating and focusing unit, a collar support unit, and a base centralizer unit.

Other objects of the present invention will become apparent to those skilled in the art to which it appertains as the description thereof proceeds.

In the accompanying drawing, in which like numerals of reference indicate similar parts throughout the several views.

Figures 8, 9, 11, 12, 13:
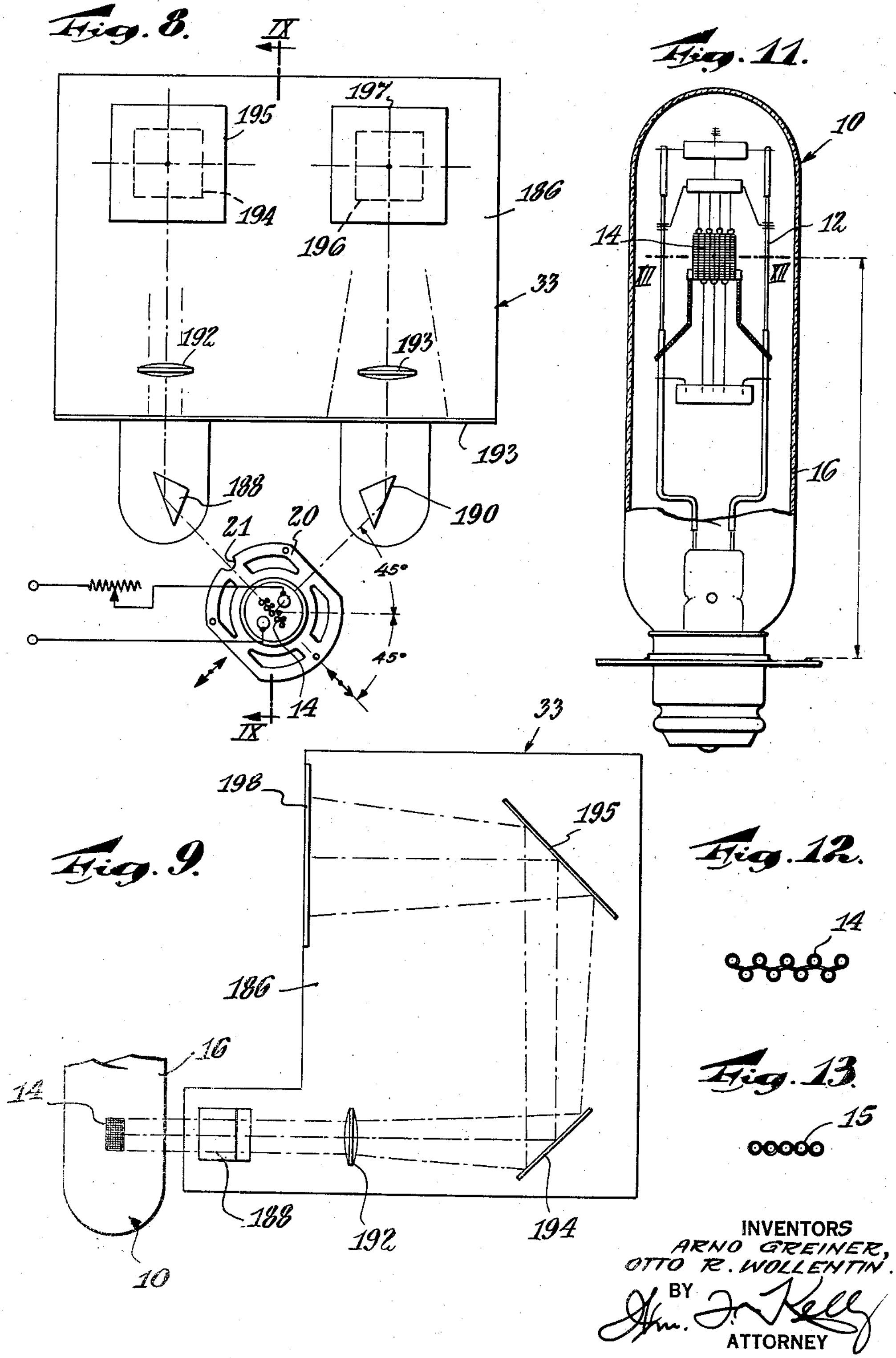
Fig. 8 is a diagrammatic view of the visual projection testing unit and prefocusing collar, showing the position of the filament with respect to the projection unit.
Fig. 9 is a diagrammatic vertical sectional view of the lamp filament and visual projection testing unit, on the line IX—IX of Fig. 8, in the direction of the arrows.
Fig. 11 is an elevational view, partially broken away, of the based projection lamp with the prefocusing collar soldered thereto.
Fig. 12 is an enlarged horizontal sectional view on the line XII—XII of Fig. 11, showing the arrangement of the sections of a bi-plane projection lamp filament.
Fig. 13 is a view similar to Fig. 12, showing the arrangement of the sections of a mono-plane projection lamp filament.

Referring to the drawing and more particularly to Figs. 11, 12 and 13, a projection lamp is designated by the reference numeral 10. This lamp 10 essentially comprises a filament mount 12 having a bi-plane filament 14 (Fig. 12), or a mono-plane filament 15 (Fig. 13), mounted and supported thereon and sealed to a vitreous tubular envelope 16. After sealing, the lamp is automatically exhausted and provided with a base 18 at the sealed end or neck of the envelope 16 by means of a suitable cement. A prefocusing collar 20, provided with a locating notch 21 (Fig. 8), is then soldered to a base 18 so that the filament coils of, for example, the bi-plane filament 14, are accurately located with respect to the base 18.

*Soldering fixture*

Figure 1:
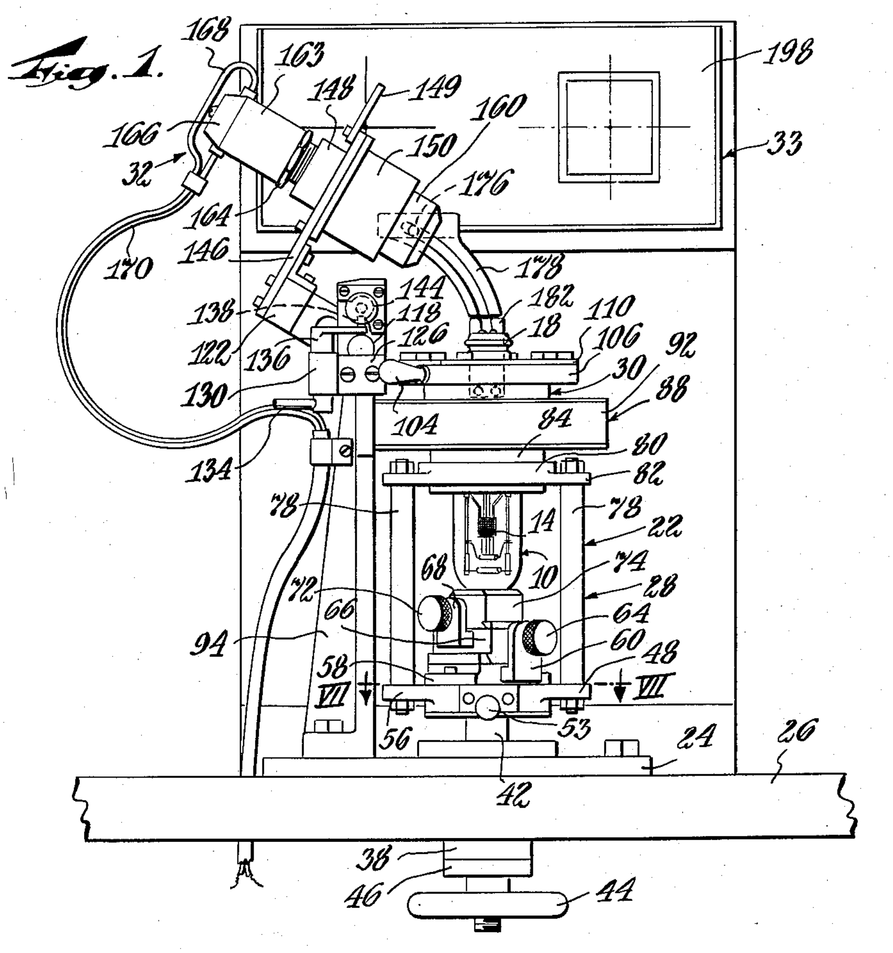
Fig. 1 is a side elevational view of an improved soldering fixture and visual projection testing unit embodying our invention, showing the base centralizer unit in the lamp and collar loading position.
Figure 2:
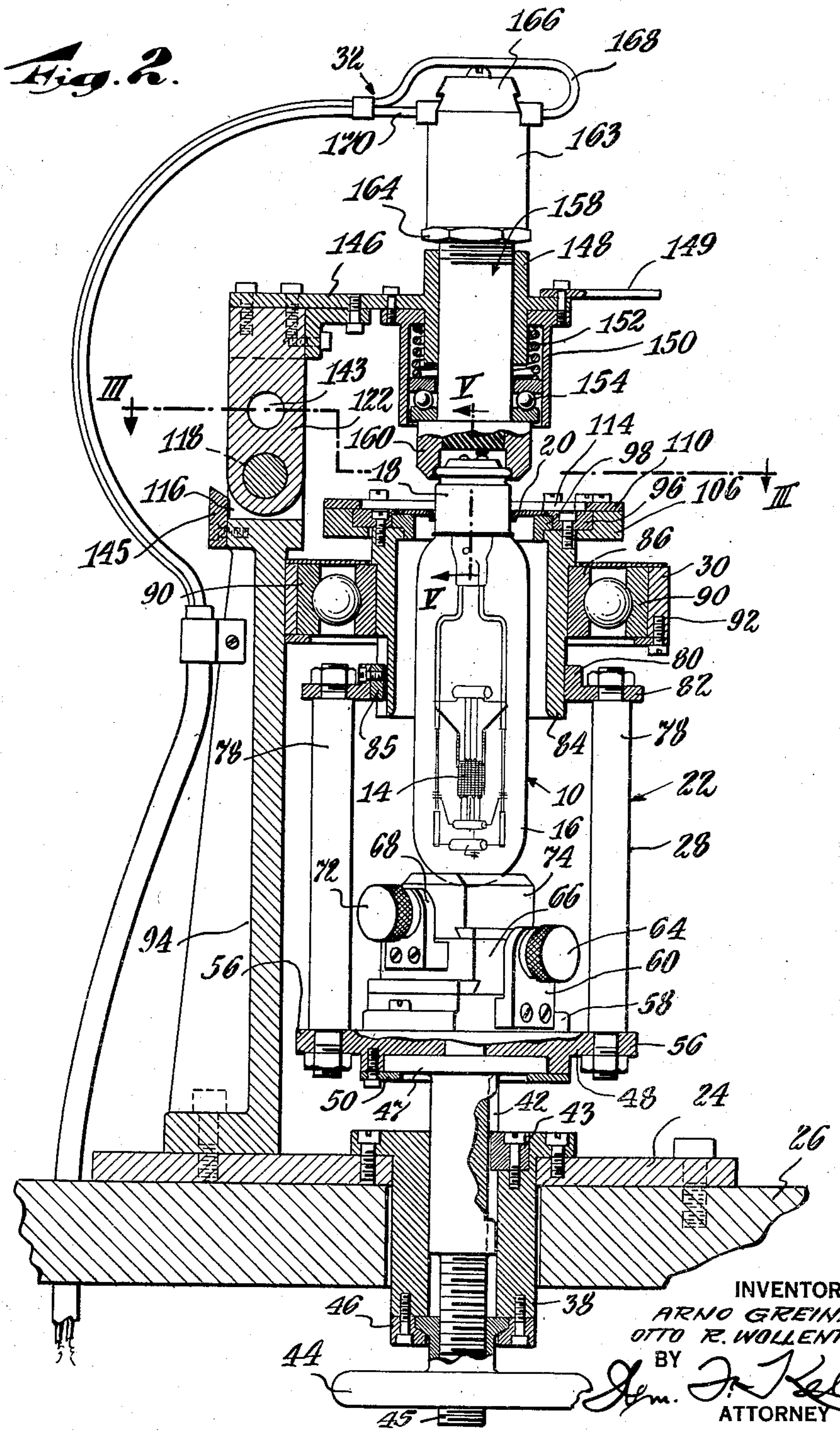
Fig. 2 is a vertical sectional view on the line II—II of Fig. 3, in the direction of the arrows, showing the soldering fixture of our invention holding a lamp and collar in position.

In the drawing, and more particularly in Figs. 1 and 2, a fixture of our invention for soldering a prefocusing collar 20 to a projection lamp base 18 is designated by the reference numeral 22. This fixture is mounted on a plate 24 which in turn is secured to a table 26. The fixture comprises an elevating and focusing unit 28, a collar support unit 30, and a base centralizer unit 32. A visual projection testing unit or projector 33 is mounted on the table 26 behind the fixture 22.

*Elevating and focusing unit*

The plate 24 and table 26 (Figs. 1, 2 and 3) are provided with suitable holes in which is mounted a flanged spindle bushing 38. This bushing is provided with an axial hole in which an elevating spindle 42 vertically reciprocates. A vertical key-way, cut in one side of the spindle 42, is engaged by a stationary key 43 extending radially inward from the bushing 38 to prevent rotation of the spindle 42, while permitting vertical reciprocation. The lower portion 45 of the spindle 42 has threaded thereon the hub of a rotatable operating handle 44, journalled on the bottom portion of the bushing 38 by means of a retainer plate 46 held by suitable bolts.

The upper portion of the spindle 42 has an annular flange 47 for rotatable engagement with the underside of a lower elevating and focusing unit mounting plate 48, and is journalled thereon by means of an annular ring or collar 50 (Fig. 2) secured to the plate 48, as by bolts. It will be understood that as the handle 44 is rotated, the spindle 42 and the lower mounting plate 48 thereon move downwardly or upwardly, depending on the direction of rotation of the handle 44.

*Spindle locking means*

Figure 7:
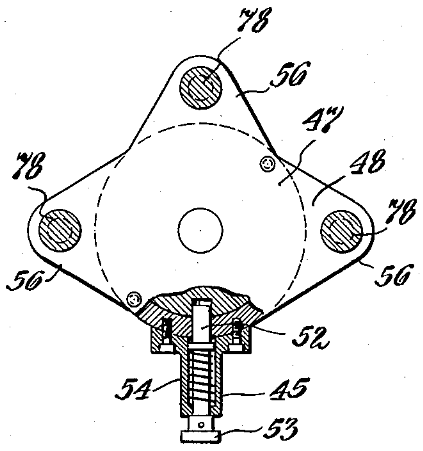
Fig. 7 is a plan view with parts in horizontal section, on the line VII—VII of Fig. 1, in the direction of the arrows, showing the details of the mechanism for locking the elevating spindle to the bottom mounting plate of the elevating and focusing unit.

As shown in Fig. 7, the lower mounting plate 48 and the engaged flange 47 of the spindle 42 are connected together by means of a spring-biased pin 52 slidable in a hollow flanged holder 54, secured as by bolts to the peripheral portion of the plate 48. The pin 52 projects, when in the normally locked position into a suitable hole in the flange 47. The pin 52 is provided with a knob 53 for disengaging it from the hole in the flange 47, and rotating the mounting plate 48. Hence, the elevating and focusing unit 28, the collar support unit 30 and the base centralizer unit 32 can be rotated approximately 90° independently of the spindle 42, to facilitate the soldering of the prefocusing collar 20 to the base 18, as hereinafter explained.

As shown in Fig. 7, this generally circular mounting plate 48 has a plurality of, for example three, mount rod flanges 56 projecting from its periphery. One of the flanges 56 projects in a direction opposite to that of the pin 52. The remaining two flanges are diametrically opposed to each other.

On the upper surface of the plate 48 (Figs. 1 and 2), suitably affixed thereon as by bolts, is a base block 58. A traversing screw mounting bracket 60 is secured to the right hand side (as shown in Figs. 1 and 2) of the block 58 by means of bolts and is provided in its upper end with a hole freely receiving the unthreaded outer end of a traversing screw 62. The screw 62 is retained in said hole by the screw threaded larger portion of the screw 62, and a knurled handle or knob 64 fastened thereto. The inner or threaded end of the screw 62 is threaded into a lower slide block 66, which is dove-tailed to and reciprocates horizontally on the base block 58. It will be understood that the rotation of the knob 64, and hence the traversing screw 62, moves the lower slide block 66 toward or away from the bracket 60.

This lower slide block 66 is similarly provided with a traversing screw mounting bracket 68 (Fig. 4) having a hole in its upper end for freely receiving therein an upper traversing screw 70. As in the case of screw 62, the screw 70 is held therein by a knurled handle or knob 72 and the screw threaded larger portion of the screw 70. In like manner the screw 70 threads into an upper focusing block 74 dove-tailed to the lower slide block 66, and reciprocates it toward and away from the bracket 68, and hence at right angles to the travel of the lower block 66 on the base block 58, as the upper screw 70 is rotated. The upper focusing block 74 is provided with a cup-shaped cavity 76 for reception of the dome of the vitreous envelope 16 of a projection lamp 10.

A plurality of mounting and supporting rods 78 (three in the present showing in Figs. 1, 2, 4, and 7) extend thru suitable holes in the mounting rod flanges 56 and are secured thereat by their threaded ends of reduced section and by suitable nuts. On the upper threaded ends of the rods 78 a hollow upper elevating and focusing unit mounting plate 80, similar in general configuration to the bottom base centralizer plate 48, and provided with upper mounting rod flanges 82, is secured by means of nuts. The hollow collar support body 84 of the collar support unit 30, provided with a vertical slot in its periphery (Fig. 2) is attached to the upper mounting plate 80 as by a key 85 projecting into a keyway in said body and held to the plate by a suitable set screw.

*Collar support unit*

Figures 3, 4, 6:
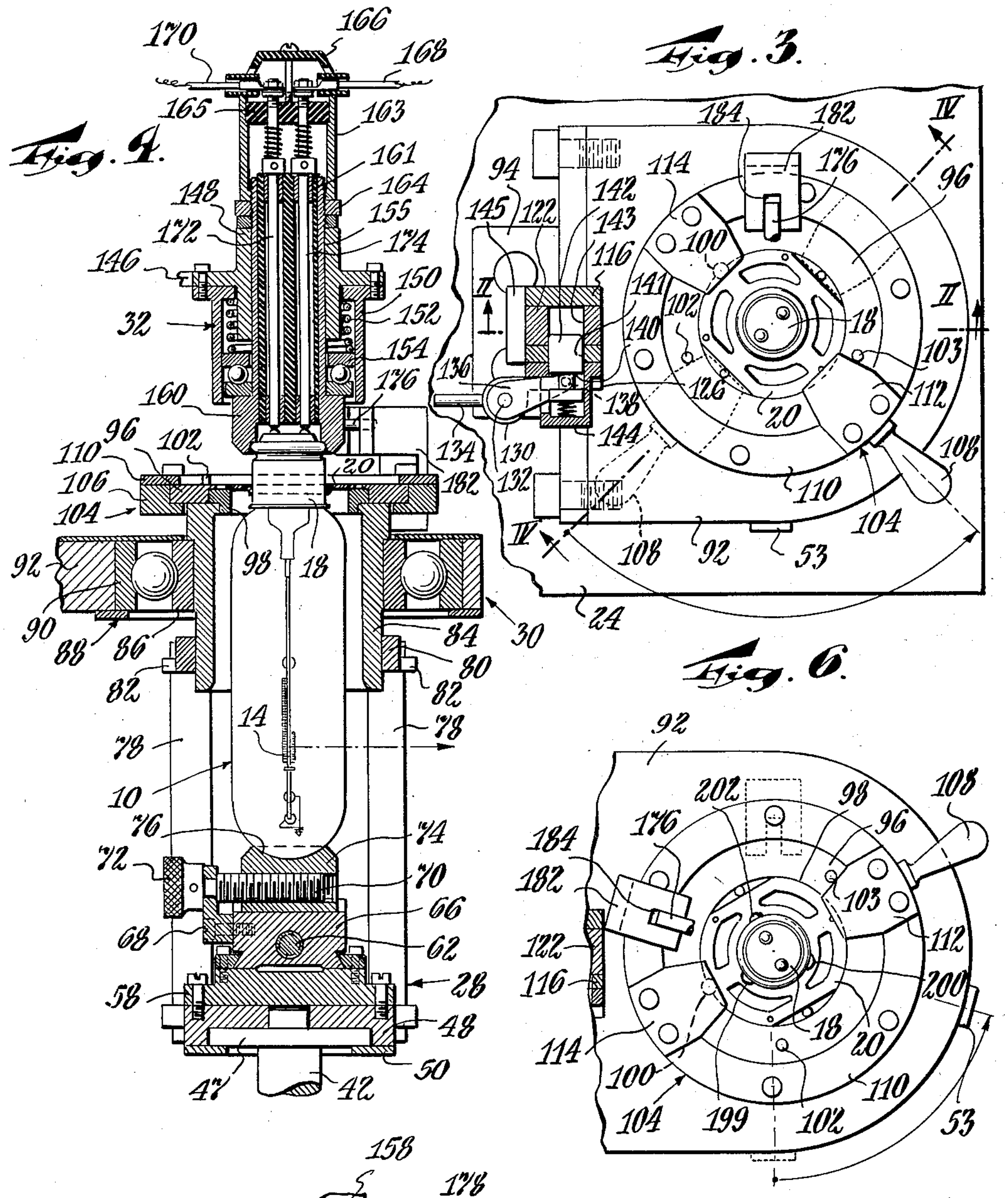
Fig. 3 is a horizontal sectional view on the line III—III of Fig. 2, in the direction of the arrows, showing the collar support unit of the soldering fixture, in position for the first two soldering operations.
Fig. 4 is a vertical sectional view of the elevating and focusing unit, collar support unit, and base centralizer unit, on the line IV—IV of Fig. 3, in the direction of the arrows.
Fig. 6 is a fragmentary view, similar to Fig. 3, but showing the locked lamp swung about 90° to permit a third soldering operation.

This body 84 (Fig. 4) is secured to the inner race 86 of a ballbearing assembly 88 having its outer race 90 affixed to a housing 92. The housing 92 is affixed to a base centralizer unit mounting bracket 94 (Fig. 1) above the upper mounting plate 80. It will be understood that the ballbearing assembly 88 allows for the approximately 90° frictionless rotation of the elevating and focusing unit 28 when it is disconnected from the spindle 42 during the soldering operation. The upper end of the body 84 is provided with an annular nest ring or collar-supporting ring 96 (Fig. 4) and a registering collar nest 98. As shown in Figs. 3 and 6, a vertical collar locating pin 100 for engaging the locating notch 21 of a prefocusing collar 20 in the nest 98, projects from the junction of the ring 96 with the nest 98. A pair of pins or stops 102 and 103 (Figs. 3 and 6), approximately 90° apart, extend from the upper surface of the ring 96 to limit the rotation of a collar locking device 104 on the outer periphery of the ring 96.

*Collar locking device*

This collar locking device 104 comprises essentially an annular locking ring 106 of L shaped cross section, having a flanged bottom portion for journalling it on the nest ring 96 (Fig. 4), an operating handle 108 on the locking ring 106, and a pair of nearly semi-annular retaining plates 110, secured by bolts to the locking ring 106. A locking plate 112 is attached suitably above the handle 108 to the annular ring 106, as by screws, and projects inwardly toward the vertical axis of the fixture 22. Diametrically opposed to the handle 108 and the locking plate 112 is a similar plate 114. It will be understood that when the handle 108 is in the loading position, shown dotted in Fig. 3, the locking plate 112 is in engagement with the pin 102 so that a collar 20 can be inserted into the nest 98 and positioned therein by means of the locating pin 100.

The locking plates 112 and 114, in the dotted position shown in Fig. 3, are parallel to but spaced from the straight-sided edges of the collar 20. Counterclockwise rotation of the collar locking device 104 approximately 90° along the periphery of the nest ring 96, moves the locking plate 112 from the pin 102 to the pin 103 and positions the locking plates 112 and 114 over the curved ends of the collar 20 (one of which is adjacent the locating notch 21), and securely locks the collar 20 to the collar nest 98.

*Base centralizer*

The base centralizer unit 32 is pivotably mounted on the base centralizer unit bracket 94. Just above the ball-bearing assembly 88 (as shown in Figs. 1, 2 and 3), the upper end of the bracket 94 is provided with bifurcations 116. These bifurcations are provided with a pair of registering pivot mounting holes 118 in the lower portions of their side walls.

A base centralizer unit pivot arm 122 is rotatably secured at its lower end on a pivot member or shaft received in mounting holes 118 in the bifurcations 116. Adjacent the pivot mounting hole 118 in the forward bifurcation 116, a release arm mounting bracket 126 (Fig. 1) is affixed to the forward bifurcation 116 (Fig. 3), as by bolts extending through a flange of the bracket 126 which also has a hub 130, joined thereto as by soldering to the outer vertical edge of its flange.

A release arm shaft 132 (Figs. 3 and 4) carrying an operating handle 134 on its lower end and a release arm 136 its upper end is limitably rotatable within the hub 130. As shown in Figs. 1 and 3, the outer end of the release arm 136 carries a vertical connecting pin 138 which engages a circular groove 140, of reduced diameter, cut in the forward portion of a spring biased locking pin 142. The outer portion of the locking pin 142 and the spring biasing means are contained in a housing 144 secured, as by bolts, to the upper portion of the forward bifurcation 116.

This housing 144 consists essentially of a flat vertical mounting plate and a hollow hub, both of which have their under portions cut away to permit the engagement of the connecting pin 138 in the groove 140 of the pin 142. When the base centralizer unit 32 is in the soldering position, the inner end of the pin 142 (Fig. 3) extends through a hole 141 in the forward bifurcation 116 and into a registering locking hole 143 (Figs. 1 and 2) in the base centralizer pivot arm 122. It will be understood that when the base centralizer unit 32 is in the inclined lamp and collar loading position (Fig. 1) and resting on a stop 145 (Fig. 2) affixed to the side wall of the bracket 94, the locking pin 142 is not in engagement with the locking hole 143 in the arm 122, but is resting on the top of said arm, thus preventing the forward rotation of the base centralizer unit.

To permit the forward rotation of the base centralizer unit 32, the handle 134 is turned clockwise (Fig. 3), thus withdrawing the locking pin 142 from the forward bifurcation 116 and permitting the arm 122, and hence the base centralizer unit 32, to rotate forwardly into position on top of the lamp base 18, as hereinafter explained. The handle 134 is then released permitting the locking pin 142 to extend through the locking hole 143 in the arm 122, thus securely locking said arm and the base centralizer unit 32 in the soldering position.

As shown in Figs. 1 and 2, a base centralizer mounting plate 146 is secured, by means of bolts and suitable brackets, on the upper end of the base centralizer pivot arm 122. The inner end of the plate 146 is provided with a mounting hub 148 (Fig. 4) projecting above and below the bracket 146. The inner end of the bracket 146 is also provided with a suitable handle 149 (Fig. 1) for raising and lowering the base centralizer unit 32. A housing 150 is secured, as by bolts, to the underside of the bracket 146, thus enclosing the lower portion of the mounting hub 148 and a compression spring 152 therebetween. The spring 152 has a lower end resting on a ball bearing assembly 154, which is secured between the housing 150 and an upper cylindrical portion 155 (Fig. 4) of a base centralizer unit body 158 and rests on a lower shouldered portion 160 of the said hollow body 158, contoured at its lower end to fit a base 18.

The hollow cylindrical portion 155 (Fig. 4) is provided with a solid cylindrical insulator 161 having suitable contact rod holes extending substantially its entire length. As shown in Figs. 1, 2 and 4, an upper housing 163 is secured in adjusted position, as by a lock nut 164, to the upper threaded end of the cylindrical portion 155 of the body 158. This upper housing 163 is provided with an upper insulating plug 165 (Fig. 4) and a cover or cap 166 secured thereon, as by a bolt, and with flexible lead-in conductors 168 and 170 from a suitable power supply.

These lead-in conductors 168 and 170 are connected within the cover 166 to a pair of spring-biased vertical contact rods 172 and 174, respectively, which extend through the upper plug 165 in the upper housing 163, and the contact rod holes in the insulator 161 of the body 158, and project below said insulator, thus making contact, as shown in Fig. 4, with the contacts of a base 18. It will be understood from Fig. 4 that the lead-in conductors 168 and 170 and the contact rods 172 and 174 are suitably insulated from each other and the above-mentioned metallic parts of the base centralizer unit 32.

As shown in Figs. 1 and 4, a horizontal guide and interlocking pin 176 is carried by the lower shouldered portion 160 of the base centralizer unit body 158. This pin rides within a channel-shaped guide rail 178 curved concentrically with the pivot shaft of the pivot arm 122. This guide rail 178 is suitably mounted by a bracket depending from the visual projector unit 33.

*Base centralizer interlocking device*

A U-shaped interlocking bracket 182 (Figs. 4 and 5) is affixed, as by a bolt, to the collar support body 84 (Fig. 5), and is so positioned with respect thereto that a vertical interlocking slot 184 in the upper side wall of the bracket 182 is directly beneath the lower end of the guide rail 178 when the spindle 42 is connected to the lower elevating and focusing unit mounting plate 48.

It will be understood that when the pin 176 is in the slot 184 in the bracket 182, that the body 158 and upper housing 163 of base centralizer unit 32 are locked to the collar support unit 30 and the elevating and focusing unit 28. Upon release of the lower mounting plate 48 of the elevating and focusing unit 28 from the elevating spindle 42, these above-mentioned parts of the base centralizer unit 32 will rotate with the collar support unit 30 and the elevating and focusing unit 28, approximately 90° to position the parts for a third soldering of the collar 20 to the base 18.

*Visual projection testing unit*

The projector 33 (Fig. 1) is mounted on the plate 24 behind the elevating and focusing unit 28, collar support unit 30 and base centralizer unit 32, by means of suitable brackets (not shown). As shown in Figs. 8 and 9, the projector 33 comprises a housing 186, a pair of prisms 188 and 190 on the lower forward portion, lenses 192 and 193, and mirrors 194, 195, 196 and 197 (Fig. 9) for directing end and front view images of the biplane filament 14 (Fig. 12) or of the monoplane filament 15 (Fig. 13) on a ground glass screen 198. These images must be adjusted by means of the elevating and focusing unit 32 to appear within the limit lines marked on the screen 198.

*Operation*

A based projection lamp 10 is inserted into the soldering fixture 22 of our invention in the base-up position with the rounded dome of the vitreous envelope 16 (Figs. 1, 2 and 4) resting in the cup-shaped cavity 76 on the upper focusing block 74. It will be understood that the base centralizer unit is locked in the "up" position shown in Fig. 1, with the base centralizer arm 122 on the stop 145, and the inner end of the locking pin 142 resting on the top of the pivot arm 122. The collar locking plate 112 (shown dotted in Fig. 3) of the collar support unit 30 is resting against the stop 102 on the nest ring 96 to permit the insertion of a prefocusing collar 20 in the collar nest 98. The locating pin 100 is in engagement with the locating notch 21 of the collar 20.

By means of the locking handle 108 (Figs. 3 and 4) on the locking ring 106, the collar locking plate 112 is rotated counterclockwise approximately 90° into its full-line position in contact with the stop 103 on the nest ring 96, causing locking plates 112 and 114 to overlap the rounded ends of the collar 20 and secure it in the collar nest 98.

The handle 134 (Figs. 1 and 3) on the vertical release arm shaft 132 is turned in a clockwise direction causing the connecting pin 138 on the release arm 136 to move the locking pin 142 through the forward bifurcation 116, thus permitting the downward guided rotation of the base centralizer unit 32 (by means of the handle 149 (Fig. 2) on the base centralizer mounting bracket 146). The horizontal guide and interlocking pin 176 on the flange 160 travels in the guide rail 178 (Fig. 1) and into the interlocking slot 184 in the bracket 182 of the collar support unit 30, until the lower ends of the vertical contact rods 172 and 174 engage the base contacts of the projection lamp base 18.

Figure 5:
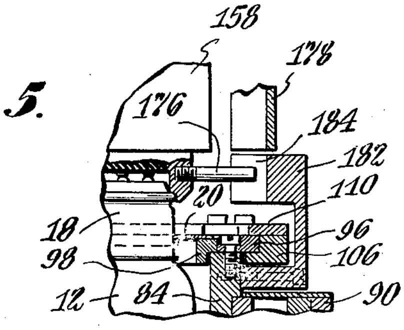
Fig. 5 is a fragmentary vertical sectional view, on the line V—V of Fig. 2, in the direction of the arrows, showing the details of the interlocking arrangement between the collar support unit and the base centralizer unit when such units are in the locked position.

The horizontal guide pin 176 in the vertical guide slot 184 of the guide bracket 182 thus locks the rotatable parts of the base centralizer unit 32 to the collar support unit 30 and the elevating and focusing unit 28, as shown in Fig. 5. Sufficient current is supplied to the lamp through the leading-in conductors 168 and 170 and rods 172 and 174, from a suitable supply (Fig. 8), to light the biplane filament 14 (Fig. 12) or the monoplane filament 15 (Fig. 13), to a desired brightness, so that its image appears near the limit lines marked on the ground glass screen 198 (Fig. 10) of the projector 33.

Figure 10:
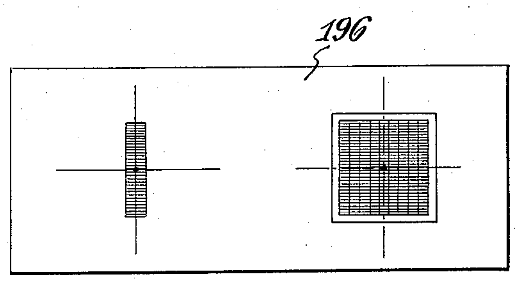
Fig. 10 is a front elevational view of the screen of the visual projection testing unit, showing the two images of the lamp filament, when in properly aligned position.

By means of the handle 44 (Figs. 1 and 2) on the elevating spindle 42, the lamp 10 and its filament 14, for example, is raised or lowered until the face and edge filament images on the screen 198 (Figs. 1, 8, 9 and 10) appear within the top and bottom horizontal limit lines marked on the two positions on the screen 196. The knurled knob or handle 64 on the traversing screw 62 (Figs. 1 and 2) and the knurled knob 72 on the traversing screw 70 are rotated in the required directions to respectively properly locate horizontally the lower slide block 58 and the focusing block 74, and hence to locate the two filament images within the vertical limit lines marked on the screen 198 (Fig. 10).

As shown in Fig. 6, the prefocusing collar 20 may then be soldered to the base 18 at 199 and 200. The lower elevating and focusing unit mounting plate 48 is then disengaged from the elevating spindle 42 by removal of the pin 52 (Fig. 7) from the hole in the elevating spindle 42. The based lamp 10, suspended between the elevating and focusing unit 28 and the above-mentioned rotatable parts of the base centralizer unit 32 and the collar 20 secured in the collar support unit 30, are swung by means of the knob 53 on pin 52 approximately 45°, either clockwise or counterclockwise from their normal position, to facilitate the soldering of the collar 20 to the base 18, as at 202. It will be understood that the clockwise rotation of these parts from their normal position is limited by the striking of the interlocking bracket 182 on the collar support unit 30 against the rear bifurcation 116 of the base centralizer unit 32. The counterclockwise rotation is limited by the striking of the knob 53 on the keying pin 52 against the base centralizer unit mounting bracket 94.

After completion of the soldering operation at the indicated points 199, 200 and 202 (Fig. 6), the pin 52 is returned to its normal position in the hole in the elevating spindle 42. The handle 134 on the vertical release arm shaft 132 is again moved clockwise, thus withdrawing the locking pin 142 from the locking pin hole 143 in the base centralizer pivot arm 122, and permitting the upward withdrawal of the arm 122 by means of the base centralizer unit handle 149 (as guided by the horizontal guide pin 176 between the guide rail 178) to its upper and normal loading position on the stop 145. The handle 134 is released, thus permitting the locking pin 142 to be returned by its spring through the forward bifurcation 116, and rest against the upper side of the now inclined base centralizer pivot arm 122, thus locking the arm 122 and hence the base centralizer unit 32 in the lamp and collar loading position.

Although a preferred embodiment of our invention has been disclosed, it will be understood that modifications may be made within the spirit and scope of the invention.

We claim:

1. A collar-support unit for positioning an annular prefocusing collar in a predetermined position on a lamp base preparatory for the soldering of the collar to the lamp base, the collar being provided with a locating notch and having opposed chordal side portions, comprising a collar-support body provided with an aperture in which the lamp base may be positioned, a collar-supporting ring disposed on the collar-support body in said aperture for supporting the collar when such collar is positioned about the lamp base, means on said collar-supporting ring for engaging said locating notch to position said collar in the predetermined position, a collar-nest ring mounted on the collar-support body and about the collar-supporting ring to define with the collar-supporting ring a nest in which the collar may be confined while in the predetermined position, and a collar-locking means having opposed collar securing portions similar in configuration to the opposed chordal side portions of said collar, said collar locking means being movable on the collar-nest ring between a collar-loading position in which the opposed collar securing portions register with but do not engage the opposed chordal side portions thereby permitting a collar to be loaded into the nest in the predetermined position and a collar-locking position where the opposed collar securing portions engage and secure the collar in the predetermined position.

2. A collar-support unit for positioning an annular prefocusing collar in a predetermined position on a lamp base preparatory for the soldering of the collar to the lamp base, the collar being provided with a locating notch and having opposed chordal side portions, comprising a collar-support body provided with an aperture in which the lamp base may be positioned, a collar-supporting ring disposed on the collar-support body in said aperture for supporting the collar when such collar is positioned about the lamp base, means on said collar-supporting ring for engaging said locating notch to position said collar in the predetermined position, a collar-nest ring mounted on the collar-support body and about the collar-supporting ring to define with the collar-supporting ring a nest in which the collar may be confined while in the predetermined position, a collar-locking means having opposed collar securing portions similar in configuration to the opposed chordal side portions of said collar, said collar locking means being movable on the collar-nest ring between a collar-loading position in which the opposed collar securing portions register with but do not engage the opposed chordal side portions thereby permitting a collar to be loaded into the nest in the predetermined position and a collar-locking position where the opposed collar securing portions engage and secure the collar in the predetermined position, and means on the collar-nest ring for limiting the movement of the collar-locking means between the collar-loading position and the collar-locking position.

3. A collar-support unit for positioning an annular prefocusing collar in a predetermined position on a lamp base preparatory for the soldering of the collar to the lamp base, the collar being provided with a locating notch and having opposed chordal side portions, comprising a collar-support body provided with an aperture in which the lamp base may be positioned, a collar-supporting ring disposed on the collar-support body in said aperture for supporting the collar when such collar is positioned about the lamp base, means on said collar-supporting ring for engaging said locating notch to position said collar in the predetermined position, a collar-nest ring mounted on the collar-support body and about the collar-supporting ring to define with the collar-supporting ring a nest in which the collar may be confined while in the predetermined position, and a collar-locking ring provided with a locking plate having opposed collar securing portions similar in configuration to the opposed chordal side portions of said collar, said collar-locking ring being rotatable on the collar-nest ring between a collar-loading position in which the opposed collar securing portions register with but do not engage the opposed chordal side portions thereby permitting a collar to be loaded into the nest in the predetermined position and a collar-locking position where the opposed collar securing portions of the collar-locking plate engage and secure the collar in the predetermined position.

4. A collar-support unit for positioning an annular prefocusing collar in a predetermined position on a lamp base preparatory for the soldering of the collar to the lamp base, the collar being provided with a locating notch and having diametrically opposed chordal side portions, comprising a collar-support body provided with an aperture in which the lamp base may be positioned, a collar-supporting ring disposed on the collar-support body in said aperture for supporting the collar when such collar is positioned about the lamp base, means on said collar-supporting ring for engaging said locating notch to position said collar in the predetermined position, a collar-nest ring mounted on the collar-support body and about the collar-supporting ring to define with the collar-supporting ring a nest in which the collar may be confined while in the predetermined position, a collar-locking ring provided with diametrically opposed locking plates, each plate having a configuration similar to the opposed chordal side portions of said collar, said collar-locking ring being rotatable on the collar-nest ring between a collar-loading position in which the opposed locking plates register with but do not engage the opposed chordal side portions thereby permitting a collar to be loaded into the nest in the predetermined position and a collar-locking position where the collar-locking plates engage and secure the collar in the predetermined position, and means on the collar-nest ring for limiting the movement of the collar-locking plates between the collar-loading position and the collar-locking position.

References Cited in the file of this patent

UNITED STATES PATENTS

| | | |
|---|---|---|
| 190,043 | Hurd | Apr. 24, 1877 |
| 270,323 | Mann | Jan. 9, 1883 |
| 1,708,756 | Fagan et al. | Apr. 9, 1929 |
| 1,894,733 | Cushing | Jan. 17, 1933 |
| 2,132,369 | Geiger et al. | Oct. 4, 1938 |
| 2,211,586 | Schwarz | Aug. 13, 1940 |
| 2,768,595 | Kalbow et al. | Oct. 30, 1956 |
| 2,768,596 | Kalbow et al. | Oct. 30, 1956 |